US008708817B1

(12) United States Patent
de la Carcova (10) Patent No.: US 8,708,817 B1
(45) Date of Patent: Apr. 29, 2014

(54) GRAPHIC CARD ANIMATION SYSTEM FOR VIRTUAL CARD GAMES

(75) Inventor: Tiburcio de la Carcova, Santiago (CL)

(73) Assignee: DeNA Co., Ltd., Tokyo (JP)

(*) Notice: Subject to any disclaimer, the term of this patent is extended or adjusted under 35 U.S.C. 154(b) by 0 days.

(21) Appl. No.: 13/554,892

(22) Filed: Jul. 20, 2012

(51) Int. Cl.
*A63F 13/00* (2006.01)

(52) U.S. Cl.
USPC ............ 463/31; 463/16; 463/17; 463/18; 463/19; 463/20; 463/30; 463/32; 463/33; 463/37

(58) Field of Classification Search
USPC ............ 463/16–20, 30–34, 37, 46, 22, 43
See application file for complete search history.

(56) References Cited

U.S. PATENT DOCUMENTS

| 8,044,933 B2* | 10/2011 | Hong et al. .......... 345/158 |
| 8,447,513 B2 | 5/2013 | Orr et al. .......... 701/400 |
| 2006/0189384 A1* | 8/2006 | Crawford et al. .......... 463/31 |

* cited by examiner

*Primary Examiner* — Sunit Pandya
(74) *Attorney, Agent, or Firm* — Pillsbury Winthrop Shaw Pittman LLP (57) ABSTRACT

The disclosure relates to a graphic card animation display system for electronic card games. The system may be configured to display one or more electronically generated images of an electronic game card based on an orientation of the system. Animating the display of the one or more electronically generated images of an electronic game card based on an orientation of the system may increase and/or enhance the interest level of a user playing the electronic card game. In some implementations, the system may comprise a display, one or more sensors, one or more processors, a user interface, electronic storage, a housing, and/or other components.

20 Claims, 6 Drawing Sheets

GRAPHIC CARD ANIMATION SYSTEM FOR VIRTUAL CARD GAMES

FIELD

The disclosure relates to a graphic card animation display system for electronic card games. The system may be configured to display one or more electronically generated images of an electronic game card based on an orientation of the system.

BACKGROUND

Among a variety of social games played on mobile phones, card battle type games have gained popularity. Each card typically has an associated rarity ranking (e.g., common, uncommon, and rare) and rare cards are difficult for users to obtain. Users can collect cards from sets of thousands of cards in collections associated with the game and distributed from a game server. Rare cards are more valuable because of their limited availability and the value of the contents of the card. However, after the users obtain many rare cards as a result of playing the game for a long period of time, the user typically loses their interest to continue playing the game because the user has experienced all, or substantially all, of the finite number of the available rare cards.

SUMMARY

One aspect of the disclosure relates to a graphic card animation display system for electronic card games. The system may be configured to display one or more electronically generated images of an electronic game card based on an orientation of the system. Animating the display of the one or more electronically generated images of an electronic game card based on an orientation of the system may increase and/or enhance the interest level of a user playing the electronic card game. In some implementations, the system may comprise a display, one or more sensors, one or more processors, a user interface, electronic storage, a housing, and/or other components.

The display may be configured to present the electronically generated images to a user. In some implementations, the display may be configured to present visual information related to the electronically generated images to a user. The display may be configured to present the electronically generated images and/or the visual information related to the electronically generated images based on information determined by the processor, information entered by a user via the user interface, information stored in electronic storage, and/or other information.

One or more sensors may be configured to generate output signals conveying information related to an orientation of the display. Information related to an orientation of the display may comprise information related to a tilt angle of the display, an altitude of the display, and/or other information. The sensors may comprise one or more sensors that measure such parameters directly. The sensors may comprise one or more sensors that generate output signals related to the one or more parameters indirectly. In some implementations, the sensors may comprise one or more of a gyroscope, an accelerometer, a geomagnetic sensor, an inclinometer, an altimeter, and/or other sensors.

The processor is configured to execute one or more computer program modules. The one or more computer program modules may comprise one or more of a game module, an inventory module, a display module, an image acquisition module, an orientation module, a threshold module, and/or other modules.

The game module may be configured to manage metrics related to the electronic card game played by the user. Managing metrics may include prompting a user for input, controlling the card game responsive to the user input, and/or other actions. Metrics related to the electronic card game may include card parameters, interactions between cards played by users during the game, interaction between players, and/or other metrics. In some implementations, the system may operate in a client/server relationship with a game server.

The inventory module may be configured to manage an inventory of electronic game cards associated with a user of the system. The inventory module may be configured to obtain cards from, for example, a virtual in-game shop, via a trade between users, responsive to a user defeating other users in the game, and/or by other methods. The inventory module may be configured to store cards in and/or retrieve cards from electronic storage. The inventory module may be configured to organize the cards associated with the user into groups.

The display module may be configured to cause the display to present individual ones of a series of electronic images associated with an electronic game card. The display module may be configured to cause the display to present the individual images based on the orientation of the display.

The image acquisition module may be configured to acquire the individual ones of the series of images associated with the electronic game card. One or more images may be associated with an electronic game card. The image acquisition module may be configured to acquire the individual images from electronic storage, a game server associated with the electronic card game, and/or from other locations. In some implementations, a user may upload an electronic game card and/or images related to an electronic game card via the user interface. The image acquisition module may be configured to acquire the individual images responsive to user input via the user interface and/or automatically based on information determined by the display module, the orientation module, the threshold module, and/or other information.

In some implementations, the individual ones of the electronic images associated with the electronic game card may have a sequential order. The individual ones of the images associated with the electronic game card may comprise a series of sequential images. In some implementations, the series of sequential images may comprise slight variations on the game card art. In some implementations, the electronic game card may comprise one of the series of sequential images. In some implementations, the art in each sequential image may be different from the art included on the game card.

In some implementations, the display module may be configured to cause the display to advance and/or retreat the image presented on the display through the series of sequential images, responsive to changes in the orientation of the display, some other component of the system, and/or the system as a whole. In some implementations, the display module may be configured to cause the display to advance and/or retreat the image presented on the display responsive to changes in the orientation of the display such that the changing images mimic the effect of a physical lenticular card, for example.

The orientation module may be configured to determine one or more orientations of the display, another component of the system, and/or the system as a whole. An orientation of the display may comprise the current physical position of the display. The orientation module may be configured to determine the orientation of the display based on the output signals generated by the sensors. The output signals generated by the sensors may convey information related to the orientation of the display. The user may change the orientation of the display by tilting, rotating, and/or otherwise moving the system.

The threshold module may be configured to determine one or more orientation thresholds. The orientation thresholds may indicate a transition between the one or more orientations determined by the orientation module. In some implementations, an orientation determined by the orientation module may comprise a range of physical positions of the system. The range of physical positions may be bounded by one or more of the one or more orientation thresholds determined by the threshold module. In some implementations, the display module may be configured to display the same image over the range of physical positions that correspond to one orientation.

The user interface is configured to provide an interface between the system and one or more users through which the users may provide information to and receive information from the system. Electronic storage comprises electronic storage media that electronically stores information. The electronic storage media may comprise one or both of system storage that is provided integrally with the system and/or removable storage that is removably connectable to the system via, for example, a port or a drive. The housing may be configured to carry the display, sensors, processor, user interface, electronic storage, and/or other components of the system. The housing may be configured to be grasped and/or manipulated by the user viewing the display.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
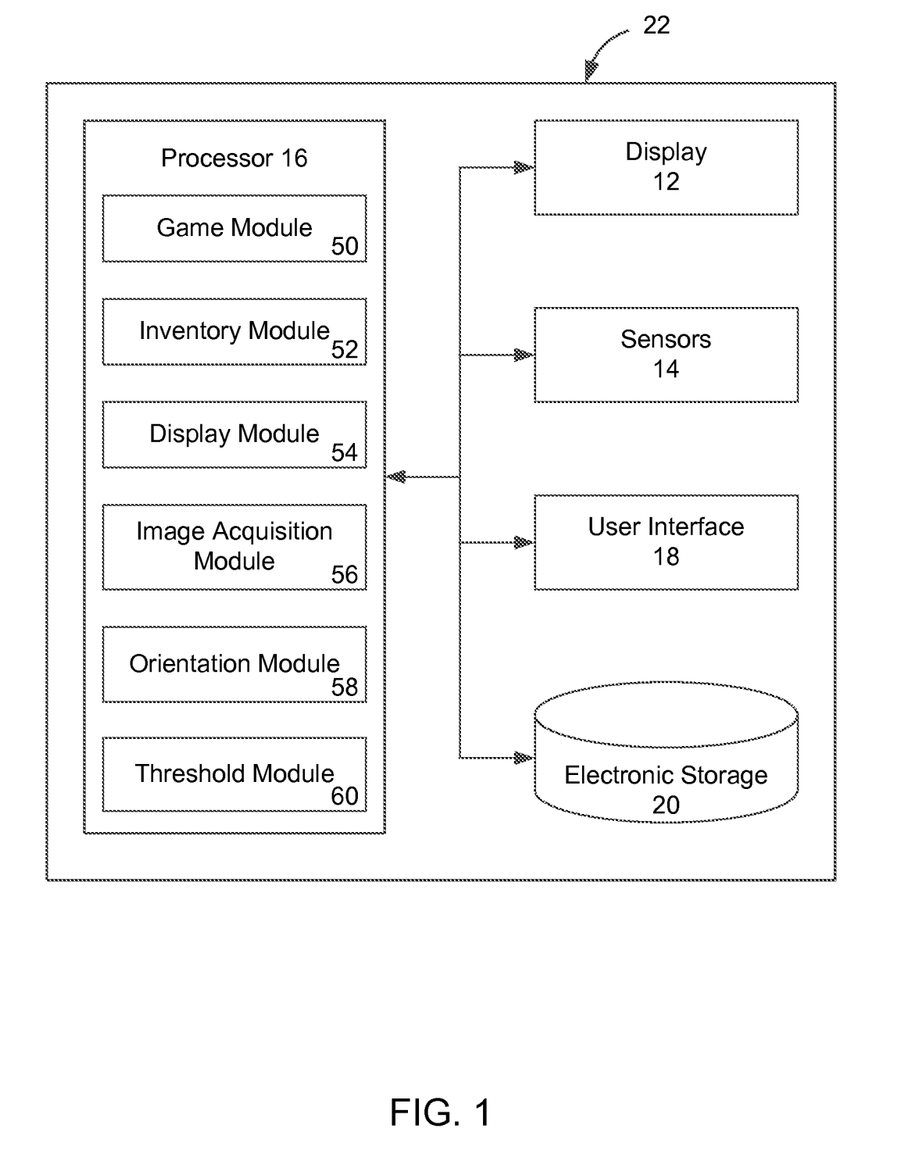
FIG. 1 is a schematic illustration of a graphic card animation display system for electronic card games.

FIG. 1 illustrates a graphic card animation display system 10 for electronic card games. System 10 may be configured to display one or more electronically generated images of an electronic game card based on an orientation of system 10. The electronic card games may include card battle type games, for example. Animating the display of the one or more electronically generated images of an electronic game card based on an orientation of system 10 may increase and/or enhance the interest level of a user playing the electronic card game. A user playing the electronic card game may be interested in the unique animation relative to other cards played during the electronic card game. In some implementations, system 10 may comprise a display 12, one or more sensors 14, one or more processors 16, a user interface 18, electronic storage 20, a housing 22, and/or other components.

Display 12 may be configured to present the electronically generated images to a user. In some implementations, display 12 may be configured to present visual information related to the electronically generated images to a user. Display 12 may be configured to present the electronically generated images and/or the visual information related to the electronically generated images based on information determined by processor 16, information entered by a user via user interface 18, information stored in electronic storage 20, and/or other information. Display 12 may be configured to present information automatically, and/or responsive to a request from a user via user interface 18. By way of non-limiting example, display 16 may include one or more of a touchscreen, a television, a projector, a three dimensional display, a computer monitor, and/or other display devices.

One or more sensors 14 may be configured to generate output signals conveying information related to an orientation of the display. Information related to an orientation of the display may comprise information related to a tilt angle of the display, an altitude of the display, and/or other information. Sensors 14 may comprise one or more sensors that measure such parameters directly (e.g., a gyroscope in system 10 that experiences the same relative motion as display 12). Sensors 14 may comprise one or more sensors that generate output signals related to the one or more parameters indirectly. For example, sensors 14 may comprise one or more altitude sensors located at various locations on display 12. The altitude sensors may be configured to generate an output based on relative altitude changes in the various locations on display 12 during use of system 10. In some implementations, sensors 14 may comprise one or more of a gyroscope, an accelerometer, a geomagnetic sensor, an inclinometer, an altimeter, and/or other sensors.

Although sensors 14 are illustrated in FIG. 1 at a single location in system 10, this is not intended to be limiting. Sensors 14 may comprise sensors disposed in a plurality of locations, such as for example, at various locations within (or in communication with) display 12, within (or in communication with) housing 22, and/or other locations.

As shown in FIG. 1, processor 16 is configured to execute one or more computer program modules. The one or more computer program modules may comprise one or more of a game module 50, an inventory module 52, a display module 54, an image acquisition module 56, an orientation module 58, a threshold module 60, and/or other modules.

Game module 50 may be configured to manage metrics related to the electronic card game played by the user. Managing metrics may include prompting a user for input, controlling the card game responsive to the user input, and/or other actions. Metrics related to the electronic card game may include card parameters, interactions between cards played by users during the game, interaction between players, and/or other metrics. For example, in card battle type games, a game character may be depicted on the virtual card. The game characters may include parameters such as hit points, defense points, magic points, and/or other points used for battle with other users. Game module 50 may be configured to manage the card battle game responsive to user input related to a hit point, a defense point, a magic point, and/or other points. In some implementations, the functionality attributed to game module 50 may be performed by a game server (not shown in FIG. 1) that is separate from system 10. In some implementations, system 10 may operate in a client/server relationship with the game server. In some implementations, animation of electronic game cards by system 10 as described herein may not be used in conjunction with game module 50.

The description herein of "electronic game cards" is not intended to limit the scope of the disclosure to virtual cards usable in a game. It will be appreciated that the principles described herein may be applied virtual and/or electronic cards of other varieties. Such cards may include greeting cards, playing cards, note cards, and/or other cards.

Inventory module 52 may be configured to manage an inventory of electronic game cards associated with a user of system 10. Inventory module 52 may be configured to obtain cards from, for example, a virtual in-game shop, via a trade between users, responsive to a user defeating other users in the game, and/or by other methods. Inventory module 52 may be configured to store cards in and/or retrieve cards from electronic storage 20. Inventory module 52 may be configured to organize the cards associated with the user into groups. For example, inventory module 52 may be configured to organize rare cards associated with the user into a rare card group. In some implementations, the functionality attributed to inventory module 52 may be performed by a game server (not shown in FIG. 1) that is separate from system 10.

Display module 54 may be configured to cause display 12 to present individual ones of a series of electronic images associated with an electronic game card. Display module 54 may be configured to cause display 12 to present the individual images based on the orientation of display 12. In some implementations, display module 54 may be configured to cause system 10 to present the individual images based on the orientation of another component of system 10, and/or based on the orientation of system 10 as a whole. For example, responsive to the orientation of display 12 being changed by the user from a first orientation to a second orientation, display module 54 may be configured to cause display 12 to change the image presented on display 12. Responsive to the orientation of display 12 being changed by the user from the second orientation back to the first orientation, display module 54 may be configured to cause display 12 to change the image presented on display 12 back to the original image.

Image acquisition module 56 may be configured to acquire the individual ones of the series of images associated with the electronic game card. One or more images may be associated with an electronic game card. Image acquisition module 56 may be configured to acquire the individual images from electronic storage 20, a game server associated with the electronic card game, and/or from other locations. In some implementations, a user may upload an electronic game card and/or images related to an electronic game card via user interface 18. Image acquisition module 56 may be configured to acquire the individual images responsive to user input via user interface 18 and/or automatically based on information determined by display module 54, orientation module 58, threshold module 60, and/or other information. In some implementations, the individual ones of the series of images associated with the electronic game card may include images related to one or more electronic file types. For example, the file types of the electronic images may include .jpeg, .bmp, .gif, and/or other image types.

In some implementations, the individual ones of the electronic images associated with the electronic game card may have a sequential order. The individual ones of the images associated with the electronic game card may comprise a series of sequential images. In some implementations, the series of sequential images may comprise slight variations on the game card art. In some implementations, the electronic game card may comprise one of the series of sequential images. In some implementations, the art in each sequential image may be different from the art included on the game card.

In some implementations, display module 54 may be configured to cause display 12 to advance and/or retreat the image presented on display 12 through the series of sequential images, responsive to changes in the orientation of display 12. Display module 54 may be configured to cause display 12 to advance the displayed image from the first image to the second image responsive to the user changing the orientation of display 12 (and/or another component of system 10 and/or system 10 as a whole) from the first orientation to the second orientation. Display module 54 may be configured to cause display 12 to retreat the displayed image from the first image to a third image responsive to the user changing the orientation of display 12 from the first orientation to a third orientation. In some implementations, the second image and the third image may be the same. In some implementations, display module 54 may be configured to cause display 12 to advance and/or retreat the image presented on display 12 responsive to changes in the orientation of display 12 such that the changing images mimic the effect of a physical lenticular card, for example.

Figure 2:
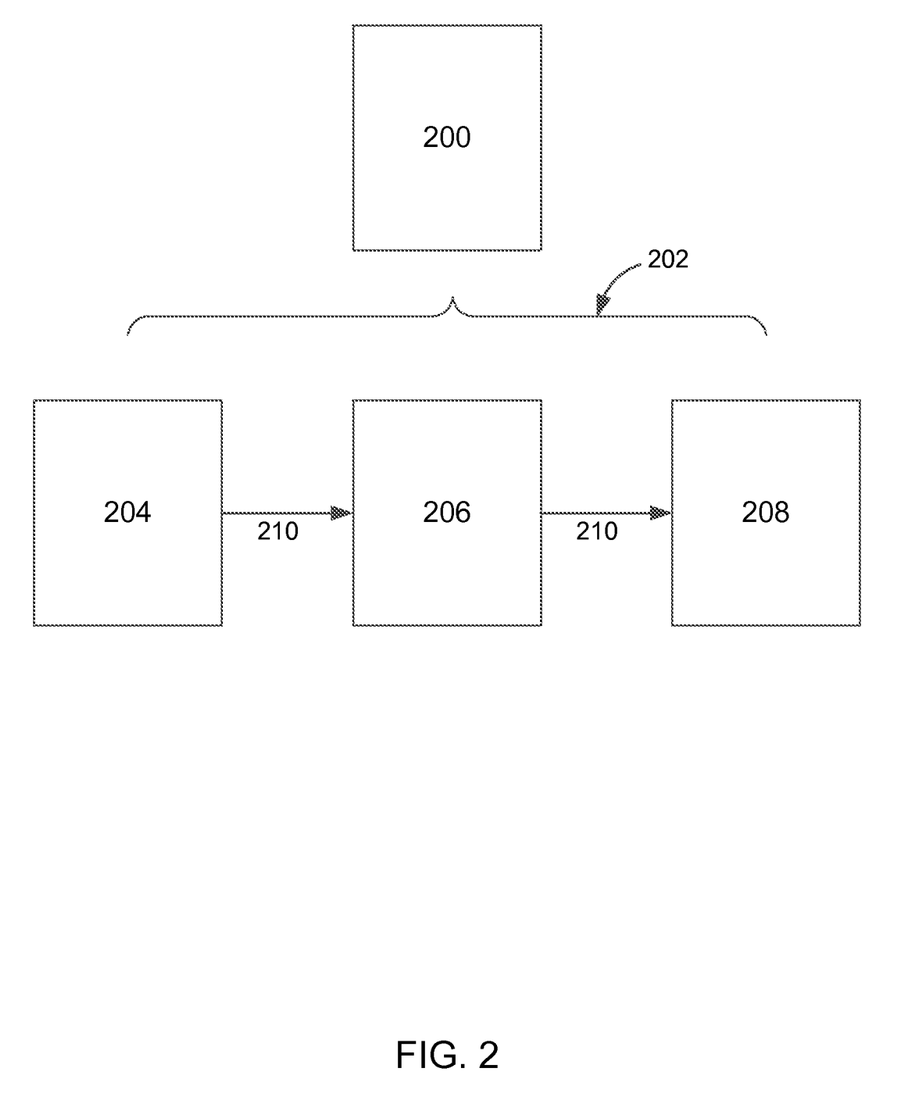
FIG. 2 illustrates a series of sequential images associated with a game card.

By way of a non-limiting example, FIG. 2 illustrates an electronic game card 200 and a series 202 of sequential game card images 204, 206, and 208 associated with game card 200. In the example shown in FIG. 2, image 204 is the first in the sequential order (sequential order indicated by arrows 210), image 206 is the second in the sequential order, and image 208 is the third image in the sequential order. When image 206 (the second image in the sequential order) is displayed on display 12 (shown in FIG. 1), display module 54 (shown in FIG. 1) may be configured to cause display 12 to advance the displayed image from image 206 to image 208 responsive to the user changing the orientation corresponding to image 206 to an orientation corresponding to image 208. Display module 54 (FIG. 1) may be configured to cause display 12 (FIG. 1) to retreat the displayed image from image 206 to image 204 responsive to the user changing the orientation of display 12 to an orientation corresponding to image 204.

Returning to FIG. 1, orientation module 58 may be configured to determine one or more orientations of display 12. In some implementations, orientation module 58 may be configured to determine one or more orientations of another component of system 10, and/or the orientation of system 10 as a whole. An orientation of display 12, for example, may comprise the current physical position of display 12. Orientation module 58 may be configured to determine the orientation of display 12 based on the output signals generated by sensors 14. The output signals generated by sensors 14 may convey information related to the orientation of display 12. Information related to the orientation of display 12 may comprise, for example, information related to a tilt angle of the display, an altitude of the display, the physical position of display 12 relative to other objects, the physical position of display 12 relative to a starting position, and/or other information.

Figure 3:
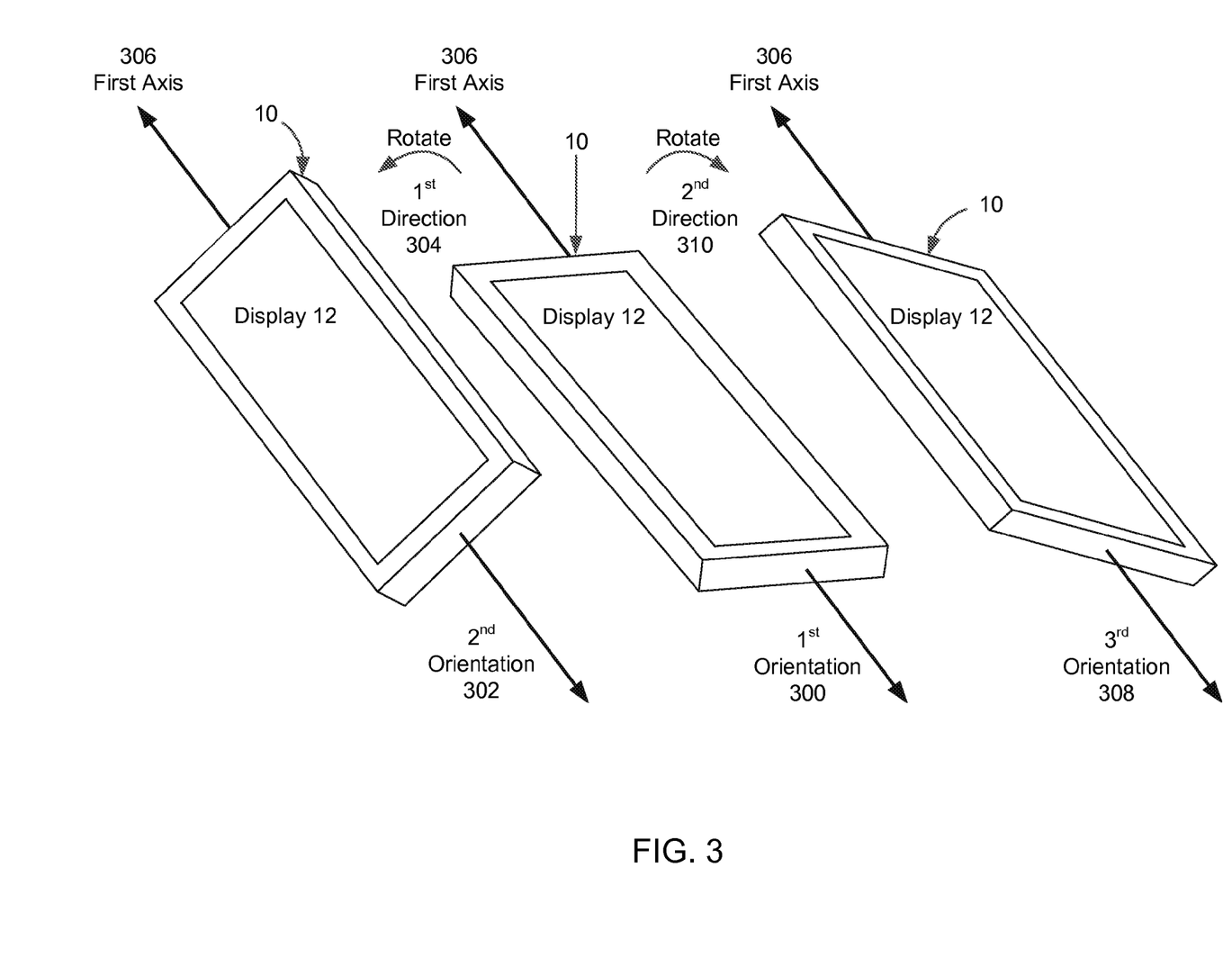
FIG. 3 illustrates changing the orientation of the display from a first orientation to a second orientation by rotating the system in a first direction about a first axis.

The user may change the orientation of display 12 by tilting, rotating, and/or otherwise moving system 10. By way of a non-limiting example, FIG. 3 illustrates changing the orientation of display 12 from a first orientation 300 to a second orientation 302 by rotating, for example, system 10 in a first direction 304 about a first axis 306. The user may change the orientation of display 12 from first orientation 300 to a third orientation 308 by rotating, for example, system 10 in a second direction 310, that is substantially opposite first direction 304, about first axis 306. The depiction of the rotation of system 10 is not intended to be limiting. Changing the orientation of display 12 may include rotating system 10 about one or more other axis, moving system 10 in other ways, and/or any other method of changing the physical position of display 12.

Returning to FIG. 1, threshold module 60 may be configured to determine one or more orientation thresholds. The orientation thresholds may indicate a transition between the one or more orientations determined by orientation module 58. In some implementations, an orientation determined by orientation module 58 may comprise a range of physical positions of system 10. The range of physical positions may be bounded by one or more of the one or more orientation thresholds determined by threshold module 60. In some implementations, display module 54 may be configured to display the same image over the range of physical positions that correspond to one orientation. In some implementations, the one or more orientation thresholds may comprise one or more tilt and/or rotational angle thresholds. For example, system 10 may be tilted and/or rotated from a first orientation, through an orientation threshold, to a second orientation. In some implementations, the one or more orientation thresholds may be determined by threshold module 60 at manufacture, determined responsive to information entered by a user via user interface 18, determined directly based the one or more output signals generated by one or more sensors 14, and/or determined by another method.

Figure 4:
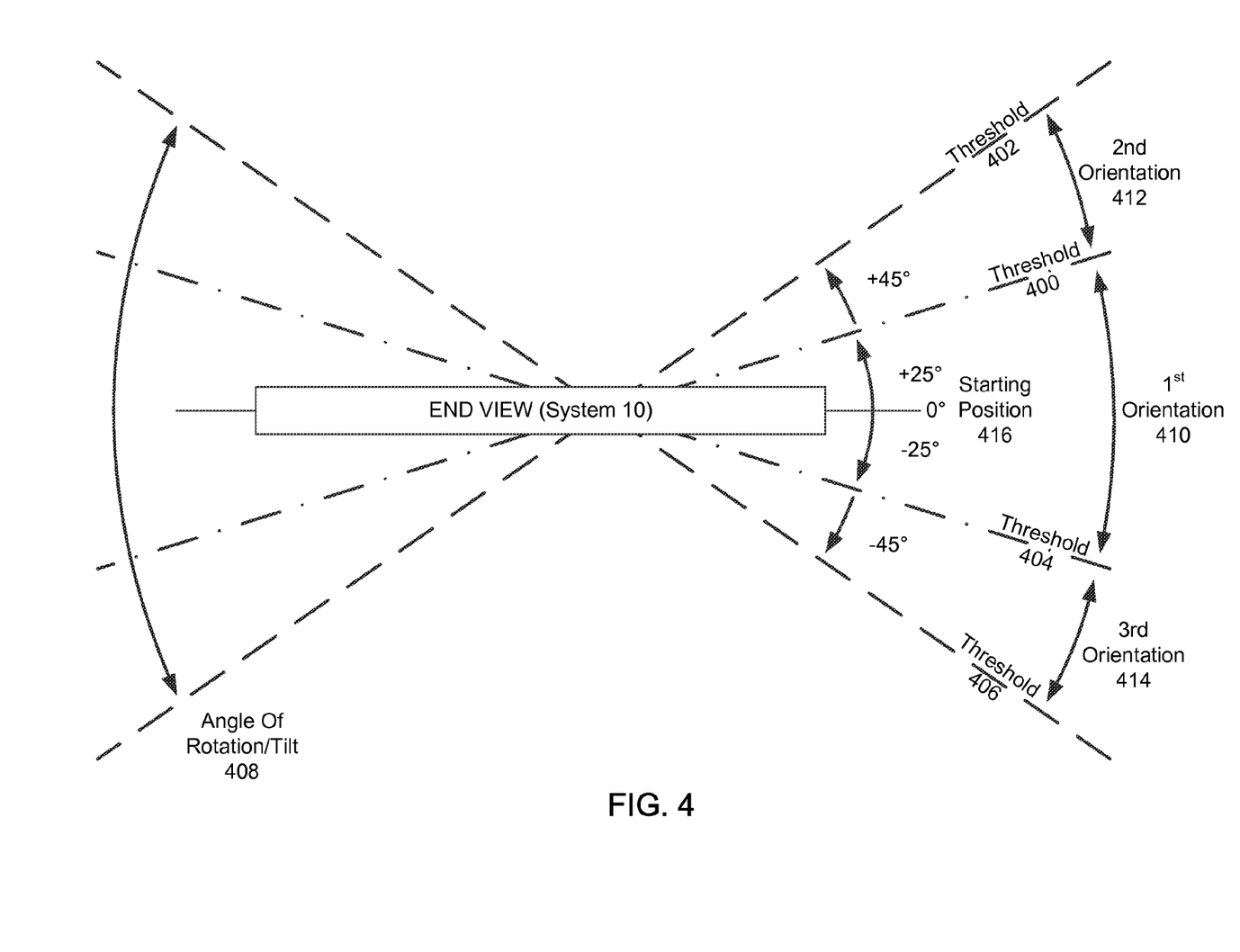
FIG. 4 illustrates and end view of the system and associated tilt and/or rotational angle thresholds.

FIG. 4 illustrates an end view of system 10 and associated tilt and/or rotational angle thresholds 400, 402, 404, 406. In FIG. 4, angle of rotation/tilt 408 may be changed such that system 10 may be tilted and/or rotated from the first orientation 410, through orientation threshold 400, to the second orientation 412. System 10 may be tilted/rotated in substantially the opposite direction, from first orientation 410, through orientation threshold 404, to the third orientation 414. In FIG. 4, first orientation 410 is bounded by threshold 400 at a tilt/rotational angle of 25 degrees in a positive direction from a zero degree starting position 416, and a tilt/rotational angle of 25 degrees in a negative direction from starting position 416. Second orientation 412 is bounded by threshold 400 at positive 25 degrees and threshold 402 at positive 45 degrees from starting position 416. Third orientation 414 is bounded by threshold 404 at negative 25 degrees and threshold 406 at negative 45 degrees from starting position 416. By way of a non-limiting example, display module 54 (shown in FIG. 1) may be configured to cause display 12 (shown in FIG. 1) to change the image presented on display 12 from a first image (e.g., image 204 in FIG. 2) to a second image (e.g., image 206 in FIG. 2) responsive to the tilt angle breaching threshold 400.

The number and/or relative displacement of thresholds and/or orientations depicted in FIG. 4 is not intended to be limiting. Tilt/rotational angle is used as an example. Any number of thresholds defining any number of orientations (corresponding to any type of movement, not just tilt/rotation) that allow system 10 to function as described herein are contemplated by the present disclosure. For example, the tilt angle thresholds may comprise a series of one or more tilt angle thresholds that correspond to successively steeper tilt angles. Display module 54 (shown in FIG. 1) may be configured to cause display 12 (shown in FIG. 1) to change the image presented on display 12 responsive to the tilt angle of display 12 being changed by the user such that the tilt angle of display 12 breaches one or more of the tilt angle thresholds in the series of tilt angle thresholds.

Figure 5:
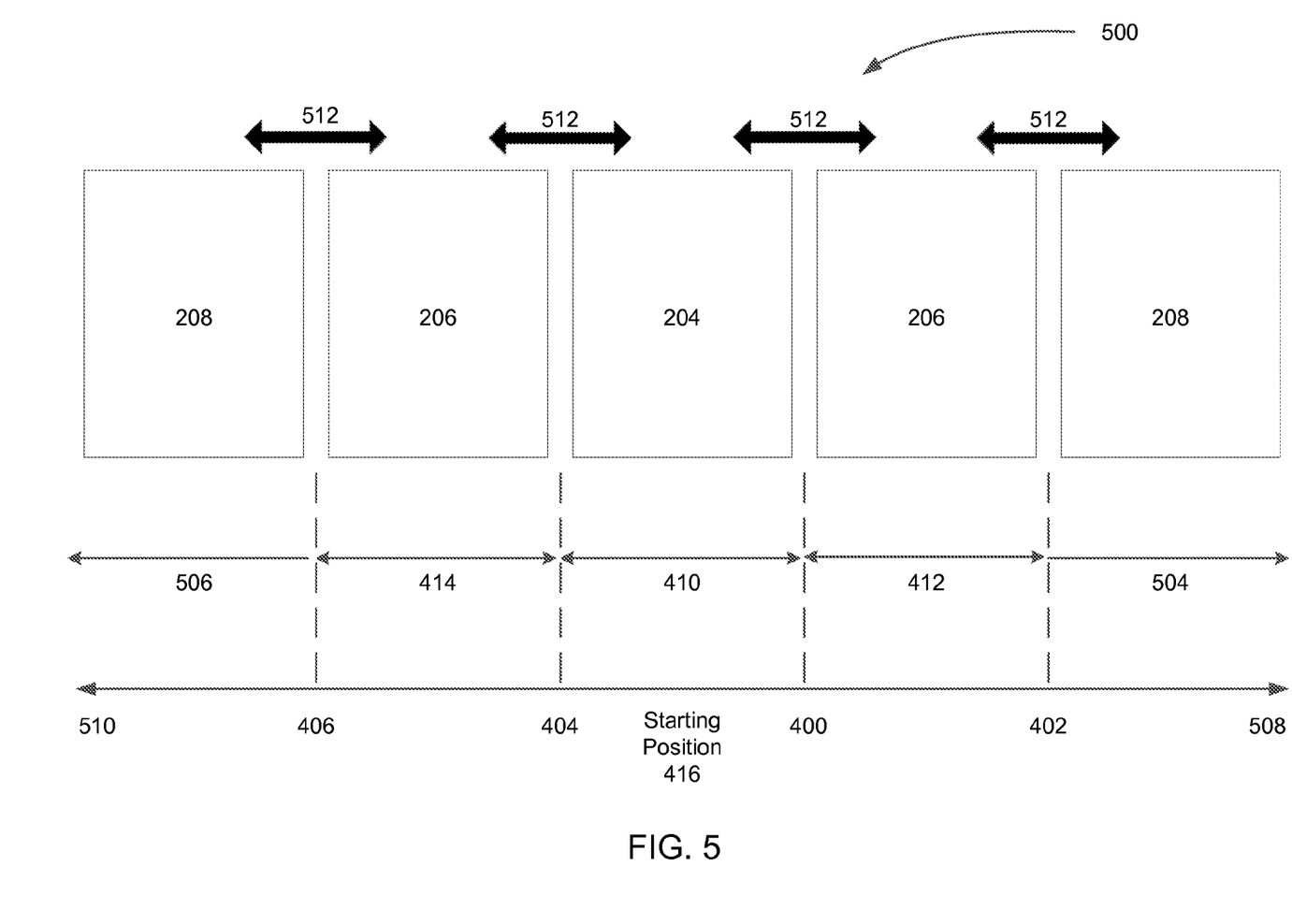
FIG. 5 illustrates an animation sequence for an electronic game card.

FIG. 5 illustrates an animation sequence 500 for an electronic game card. In FIG. 5, sequential images 204, 206, and 208 of game card 200 (shown in FIG. 2) are arranged in animation sequence 500. Image 204 is positioned in first orientation 410 at starting position 416. Image 206 is positioned in second orientation 412 and third orientation 414. Image 208 is positioned in fourth orientation 504 and fifth orientation 506. Display module 54 (shown in FIG. 1) may be configured to cause display 12 (shown in FIG. 1) to change the image presented on display 12 responsive to the orientation of display 12 being changed by the user in a first 508 and/or second 510 direction. Responsive to the orientation of display 12 breaching one or more of the thresholds in the series of thresholds 406, 404, 400, 402, display module 54 may be configured to cause display 12 to change the image from image 204 to image 206, and/or from image 206 to image 208, as shown in FIG. 5, for example.

In some implementations, at orientations (not shown) beyond fourth orientation 504 in first direction 508, and/or beyond fifth orientation 506 in second direction 510, display module 54 (FIG. 1) may be configured to control display 12 (FIG. 1) to display image 208. In some implementations, at orientations beyond fourth orientation 504 in first direction 508, and/or beyond fifth orientation 506 in second direction 510, display module 54 may be configured to control display 12 to continue to sequentially display images 208, 206, 204 responsive to the orientation of display 12 breaching orientation thresholds (not shown).

In some implementations, transitions 512 between images may be controlled by display module 54 (FIG. 1) such that the current image fades out and the next image fades in responsive to the orientation of display 12 (FIG. 1) breaching an orientation threshold 406, 404, 400, 402. Display module 54 may be configured to control other effects and/or parameters related to image transitions 512.

Returning to FIG. 1, user interface 18 is configured to provide an interface between system 10 and one or more users through which the users may provide information to and receive information from system 10. This enables data, cues, results, and/or instructions and any other communicable items, collectively referred to as "information," to be communicated between a user and processor 16, electronic storage 20, and/or other components of system 10. For example, a user may input information and/or electronic files related to an electronic game card and/or the images associated with the electronic game card into system 10 via user interface 18.

Examples of interface devices suitable for inclusion in user interface 18 comprise a keypad, buttons, switches, a keyboard, knobs, levers, a display screen, a touch screen, speakers, a microphone, an indicator light, an audible alarm, a printer, a tactile feedback device, and/or other interface devices. In some implementations, user interface 18 comprises a plurality of separate interfaces. In some implementations, user interface 18 comprises at least one interface that is provided integrally with housing 22.

It is to be understood that other communication techniques, either hard-wired or wireless, are also contemplated by the present disclosure as user interface 18. For example, the present disclosure contemplates that user interface 18 may be integrated with a removable storage interface provided by electronic storage 20. In this example, information may be loaded into system 10 from removable storage (e.g., a smart card, a flash drive, a removable disk, etc.) that enables the user(s) to customize the implementation of system 10 (e.g., information related to threshold levels, electronic files associated with the images related to an electronic game card, etc.) Other exemplary input devices and techniques adapted for use with system 10 as user interface 18 comprise, but are not limited to, an RS-232 port, RF link, an IR link, modem (telephone, cable or other). In short, any technique for communicating information with system 10 is contemplated by the present disclosure as user interface 18.

In some implementations, electronic storage 20 comprises electronic storage media that electronically stores information. The electronic storage media of electronic storage 20 may comprise one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 20 may comprise one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 20 may store software algorithms, information determined by processor 16, information received via user interface 18, and/or other information that enables system 10 to function properly. Electronic storage 20 may be (in whole or in part) a separate component within system 10, or electronic storage 20 may be provided (in whole or in part) integrally with one or more other components of system 10 (e.g., user interface 18, processor 16, etc.).

Housing 22 may be configured to carry display 12, sensors 14, processor 16, user interface 18, electronic storage 20, and/or other components of system 10. Housing 22 may be configured to be grasped and/or manipulated by the user viewing display 12. Housing 22 may be configured to contain the components of system 10 in a space small enough to be handheld and portable so a user may grasp and/or manipulate system 10 with one hand, for example. In some implementations, a gripping area may be formed in housing 22. The gripping area may comprise surface features in one or more surfaces of housing 22 configured such that the user may grasp and/or manipulate system 10 via the gripping area. The gripping area may be formed in housing 22 by way of a ridged, knurled, and/or other textured surface.

Processor 16 may be configured to provide information processing capabilities in system 10. As such, processor 16 may comprise one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may comprise a plurality of processing units. These processing units may be physically located within the same device (e.g., system 10), or processor 16 may represent processing functionality of a plurality of devices operating in coordination. Processor 16 may be configured to execute modules 50, 52, 54, 56, 58 and/or 60 by software; hardware; firmware; some combination of software, hardware, and/or firmware; and/or other mechanisms for configuring processing capabilities on processor 16.

It should be appreciated that although modules 50, 52, 54, 56, 58, and 60 are illustrated in FIG. 1 as being co-located within a single processing unit, in implementations in which processor 16 comprises multiple processing units, one or more of modules 50, 52, 54, 56, 58, and/or 60 may be located remotely from the other modules. The description of the functionality provided by the different modules 50, 52, 54, 56, 58, and/or 60 described below is for illustrative purposes, and is not intended to be limiting, as any of modules 50, 52, 54, 56, 58, and/or 60 may provide more or less functionality than is described. For example, one or more of modules 50, 52, 54, 56, 58, and/or 60 may be eliminated, and some or all of its functionality may be provided by other modules 50, 52, 54, 56, 58, and/or 60. As another example, processor 16 may be configured to execute one or more additional modules that may perform some or all of the functionality attributed below to one of modules 50, 52, 54, 56, 58, and/or 60.

Figure 6:
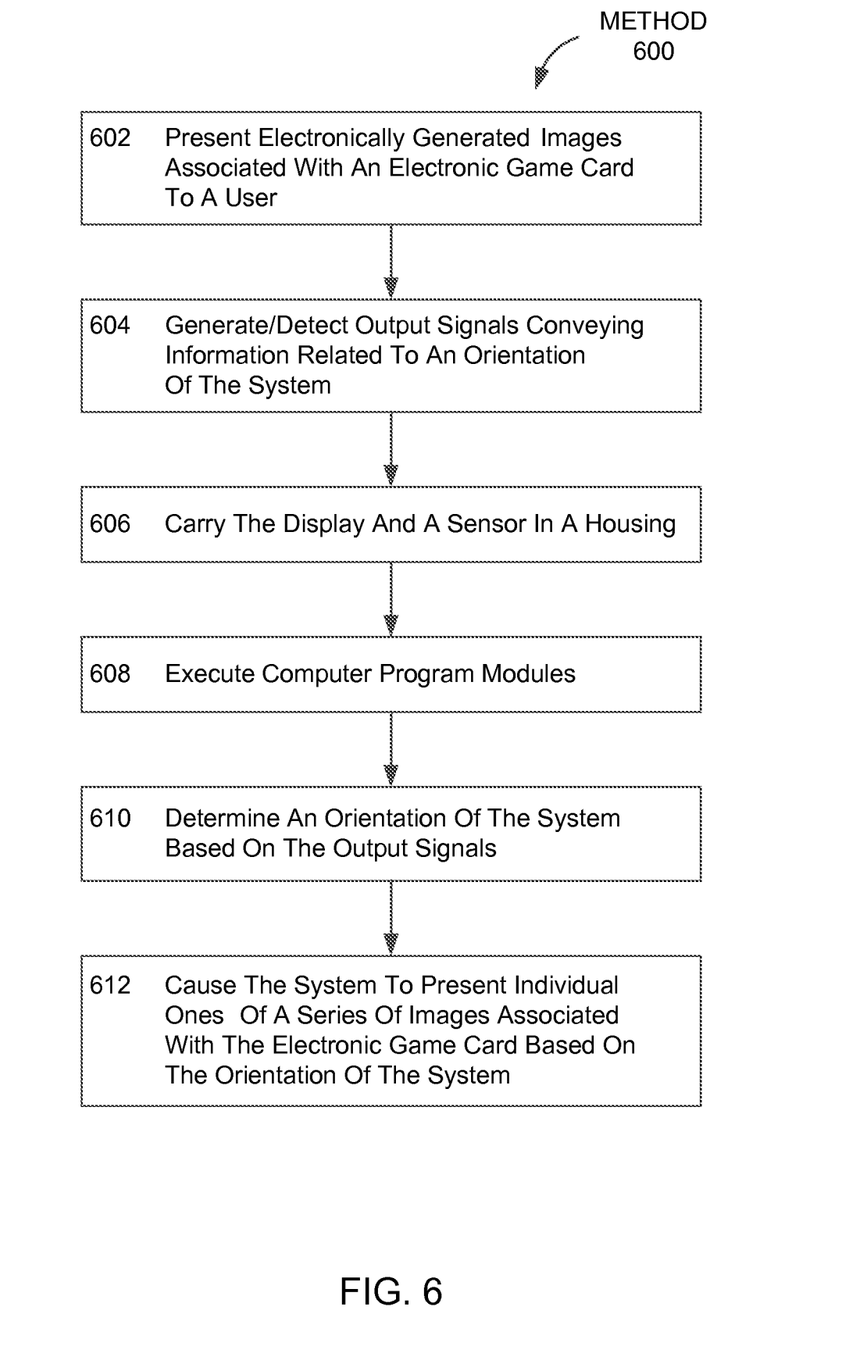
FIG. 6 illustrates a method for animating the display of graphic cards for electronic card games.

FIG. 6 illustrates a method 600 for displaying one or more electronically generated images of an electronic game card. Displaying the electronically generated images may be performed with a graphic card animation display system. The display of the images of the electronic game card may be based on an orientation of the system. The system may comprise a display, one or more sensors, a housing, and a processor. The processor may be configured to execute computer program modules. The computer program modules may include an orientation module, a display module, and/or other modules. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described herein is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600. In some implementations, at least some of the operations described below may be implemented by a server wherein the system described herein communicates with the server in a client/server relationship over a network.

At an operation 602, the electronically generated images may be presented to a user. In some implementations, operation 602 may be performed by a display the same as or similar to display 12 (shown in FIG. 1 and described herein).

At an operation 604, output signals conveying information related to an orientation of the display, another component of the system, and/or the system as a whole may be generated and/or detected. In some implementations, operation 604 may be performed by sensors the same as or similar to sensors 14 (shown in FIG. 1 and described herein).

At an operation 606, the display and the sensor may be carried with a housing. The housing may be configured to be grasped and manipulated by the user viewing the display. In some implementations, operation 606 may be performed by a housing the same as or similar to housing 22 (shown in FIG. 1 and described herein.)

At an operation 608 computer program modules may be executed. In some implementations, operation 608 may be performed by a processor the same as or similar to processor 16 (shown in FIG. 1 and described herein.)

At an operation 610, an orientation of the display, another component of the system, and/or the system as a whole may be determined. The orientation of the system may be determined based on the output signals generated by the sensors. In some implementations, operation 610 may be performed by a computer program module same as or similar to orientation module 58 (shown in FIG. 1 and described herein.)

At an operation 612, the system may be caused to present individual ones of a series of images associated with the electronic game card. The presentation of the individual ones of the series of images may be based on the orientation of the system. Responsive to a first image corresponding to a first orientation and a second image corresponding to a second orientation, and further responsive to the orientation of the system being changed by the user from the first orientation to the second orientation, the system may be caused to change the image presented from the first image to the second image. In some implementations, operation 612 may be performed by a computer program module the same as or similar to display module 54 (shown in FIG. 1 and described herein.)

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A graphic card animation display system for electronic card games, the system configured to display one or more electronically generated images of an electronic game card based on an orientation of the system, the system comprising:
    a display configured to present the electronically generated images to a user;
    a sensor configured to generate output signals conveying information related to an orientation of the display;
    a housing that carries the display and the sensor, the housing being configured to be grasped and manipulated by the user viewing the display; and
    one or more processors configured to execute computer program modules, the computer program modules comprising:
        an orientation module configured to determine an orientation of the display based on the output signals generated by the sensor; and
        a display module configured to cause the display to present individual ones of a series of images associated with the electronic game card based on the orientation of the display such that rotation of the display simulates presentation of the series of the images on a non-electronic, lenticular game card to create the visual effect of an animation in which a subject of the images is performing an action, the display module being further configured such that responsive to a first image corresponding to a first orientation and a second image corresponding to a second orientation, and further responsive to the orientation of the display being changed by the user from the first orientation to the second orientation, the display module is configured to cause the display to change the image presented on the display from the first image to the second image.

2. The system of claim 1, wherein, responsive to the orientation of the display being changed by the user from the second orientation to first orientation, the display module is configured to cause the display to change the image presented on the display from the second image to the first image.

3. The system of claim 1, wherein the individual ones of the images associated with the electronic game card have a sequential order such that the individual ones of the images associated with the electronic game card comprise a series of sequential images.

4. The system of claim 3, wherein the display module is configured to cause the display to advance and/or retreat the image presented on the display through the series of sequential images responsive to changes in the orientation of the display such that:
    the display module causes the display to advance the displayed image from the first image to the second image responsive to the user changing the orientation of the display from the first orientation to the second orientation; and
    the display module causes the display to retreat the displayed image from the first image to a third image responsive to the user changing the orientation of the display from the first orientation to a third orientation.

5. The system of claim 4, wherein the user changes the orientation of the display from the first orientation to the second orientation by tilting the display in a first direction about a first axis, and wherein the user changes the orientation of the display from the first orientation to the third orientation by tilting the display in a second direction, that is substantially opposite the first direction, about the first axis.

6. The system of claim 4, wherein the second image and the third image are the same.

7. The system of claim 1, wherein the sensor comprises one or more of a gyroscope, an accelerometer, a geomagnetic sensor, or an inclinometer.

8. The system of claim 1, wherein information related to an orientation of the display comprises information related to a tilt angle of the display.

9. The system of claim 8, wherein the display module is configured to cause the display to change the image presented on the display from the first image to the second image responsive to the tilt angle breaching a tilt angle threshold.

10. The system of claim 9, wherein the tilt angle threshold comprises a series of one or more tilt angle thresholds that correspond to successively steeper tilt angles, and wherein the display module is configured to cause the display to change the image presented on the display responsive to the tilt angle of the display being changed by the user such that the tilt angle of the display breaches one or more of the tilt angle thresholds in the series of tilt angle thresholds.

11. A method for presenting one or more electronically generated images of an electronic game card for electronic card games with a graphic card animation display system, the method for presenting based on an orientation of the system, the method comprising:
    presenting the electronically generated images to a user;
    detecting output signals conveying information related to an orientation of the system generated by a sensor; and
    executing computer program modules, executing the computer program modules comprising:
        determining an orientation of the system based on the output signals generated by the sensor; and presenting individual ones of a series of images associated with the electronic game card based on the orientation of the system such that rotation of the system simulates presentation of the series of the images on a non-electronic, lenticular game card to create the visual effect of an animation in which a subject of the images is performing an action, wherein the presenting operation includes, responsive to a first image corresponding to a first orientation and a second image corresponding to a second orientation, and further responsive to the orientation of the system being changed by the user from the first orientation to the second orientation, a currently presented image is changed from the first image to the second image.

12. The method of claim 11, wherein the presenting operation further includes the currently presented image is changed from the second image to the first image responsive to the orientation of the system being changed by the user from the second orientation to first orientation.

13. The method of claim 11, wherein the individual ones of the images associated with the electronic game card have a sequential order such that the individual ones of the images associated with the electronic game card comprise a series of sequential images.

14. The method of claim 13, further comprising causing the system to advance and/or retreat the image through the series of sequential images responsive to changes in the orientation of the system such that:

the currently presented image is advanced from the first image to the second image responsive to the user changing the orientation of the system from the first orientation to the second orientation; and the currently presented image is retreated from the first image to a third image responsive to the user changing the orientation of the system from the first orientation to a third orientation.

15. The method of claim 14, further comprising changing the orientation of the system from the first orientation to the second orientation by tilting the system in a first direction about a first axis, and changing the orientation of the system from the first orientation to the third orientation by tilting the system in a second direction, that is substantially opposite the first direction, about the first axis.

16. The method of claim 14, wherein the second image and the third image are the same.

17. The method of claim 11, wherein the sensor comprises one or more of a gyroscope, an accelerometer, a geomagnetic sensor, or an inclinometer.

18. The method of claim 11, wherein information related to an orientation of the system comprises information related to a tilt angle of the system.

19. The method of claim 18, further comprising causing the system to change the image presented from the first image to the second image responsive to the tilt angle breaching a tilt angle threshold.

20. The method of claim 19, wherein the tilt angle threshold comprises a series of one or more tilt angle thresholds that correspond to successively steeper tilt angles, and wherein the method further comprises causing the system to change the image presented responsive to the tilt angle of the system being changed by the user such that the tilt angle of the system breaches one or more of the tilt angle thresholds in the series of tilt angle thresholds.

* * * * *